United States Patent [19]
Stewart

[11] 3,901,271
[45] Aug. 26, 1975

[54] SUPPORT STRUCTURE

[76] Inventor: Richard C. Stewart, 6 Bitterroot Ct., Owings Mills, Md. 21117

[22] Filed: Oct. 9, 1973

[21] Appl. No.: 404,262

[52] U.S. Cl. .................................. 137/364
[51] Int. Cl.² ............................... F16L 58/00
[58] Field of Search .......... 137/364, 365, 366, 367, 137/369, 370; 220/3.8

[56] References Cited
UNITED STATES PATENTS

| | | | |
|---|---|---|---|
| 621,448 | 3/1899 | Dwyer | 137/370 X |
| 2,691,384 | 10/1954 | Mueller et al. | 137/366 |
| 2,827,914 | 3/1958 | Alters | 137/370 X |
| 2,931,383 | 4/1960 | Handley | 137/369 |
| 3,601,143 | 8/1971 | Glennon | 137/364 |

*Primary Examiner*—Alan Cohan
*Attorney, Agent, or Firm*—Beaman & Beaman

[57] ABSTRACT

The invention pertains to a support for valves used in buried gas and water lines having curb boxes associated therewith to enable the valves to be manipulated from a remote point at ground level. A central cavity defined by the support receives the body of the valve. Extending in opposite directions from the central cavity are axially aligned outrigger portions for receiving the pipe ends connected to the valve.

3 Claims, 6 Drawing Figures

SUPPORT STRUCTURE

BACKGROUND OF THE INVENTION

In the installation of gas and water lines in the ground, a trench is first dug and then the pipes and valves are installed in the ground below the frost line. To enable such a valve to be operated from ground level, a tubular curb box is employed having a lower end which provides access to the valve and an upper end which is at ground level. Before backfilling the trench, the lower end of the curb box is aligned with the valve and care must be taken to maintain such alignment and the vertical positioning of the curb box in the trench.

In recent years plastic pipes have come into use for both gas and water services. It has been found that the end connection portions of the plastic pipes are not capable of resisting the torque that may be developed on the valve during manipulation to open and close the same. The support of the invention is particularly adapted to be used with plastic pipes but may be used with metal pipes.

In the fall of 1971, some experimental use of a valve and curb box supports were conducted at Columbus, Ohio by Columbia Gas of Ohio in which the body of the support was styrofoam. Tests conducted on Aug. 21, 1972 on this type of supports indicated that under respective valve operation indentation of the foam took place and the effectiveness of the support was impaired.

SUMMARY OF THE INVENTION

The design of the improved support is such that the operating torque on the valve is transformed to the support through the rigid valve structure without material indentation or distortion of the support body. Such torque is in turn resisted by the ground in which the support is buried. Preferably, the pipe ends connected to the valve have clearance with the interior wall structure of the support to prevent the application of torque on the valve from being transferred to the pipe ends directly adjacent the points of attachment with the valve.

To structurally engage the support and to assist in aligning the curb box with the valve and holding the curb box erect during backfilling, both the valve and the curb box have an interference fit with the support. In practice, it has been found that by fabricating the support from a slightly flexible plastic such as ABS having a wall thickness in the order of ¼ inch, the valve may be firmly encased by the arched lower end of the curb box installed upon the support.

Preferably, the support has a relatively flat bottom portion spacing vertical opposed side portions to define an upwardly open cavity. As installed in a trench, the bottom portion rests on the flat bottom of the trench so as to vertically dispose the side portions. After the valve and pipe ends are disposed within the support and the curb box installed on the support, the earth is firmly packed against the side portions to resist the torque of manipulating the valve.

In the preferred embodiment, the central cavity portion of the support has opposed vertical ribs defined on the side portions which mate with opposed vertical recesses in the lower arched portion of the curb box. This association results in supporting the curb box in an upright position in the trench for backfilling as well as aligning the curb box with the valve cavity of the support.

DESCRIPTION OF PREFERRED EMBODIMENT

The invention is particularly adapted for use in gas and water distribution using plastic pipes as the design is such as to substantially remove the turning torque on the valve or curb stop from the connecting plastic pipe end under most ground conditions. In practice, the combination valve support and curb box has been found to fully comply with the safety standards for the transportation of gas by pipeline published by the Department of Transportation on Aug. 19, 1970 in the Federal Register, Section 192.193. However, the invention finds utility in water and gas distributors using metal pipes where torques on the connection of the pipes with the valve is not a problem.

Preferably the support is fabricated from an inert plastic material such as alpha-buna-styrene (ABS) and polyvinyl chloride (PVC) by injection or blow molding. In the illustrated embodiment, an extruded plastic tube of uniform wall thickness has been cut to length, heated and dropped into a mold of the proper cavity. The heated tube is then blown to conform to the walls of the cavity. The formed blank 10 of FIG. 2 is then removed from the mold and longitudinally split by sawing or hot cutting to provide two identical supports 12, one of which is shown in FIG. 3.

Fabricating the support 12 in the manner described above will result in the wall thickness being greater in the area of lesser expansion. Thus, with the diameter of the outrigger portions 14 of the blank 10 approximately the diameter of the original tubular extrusion from which the blank 10 is blown, the portions 14 will have the thickest wall and the greatest rigidity.

Figure 2:
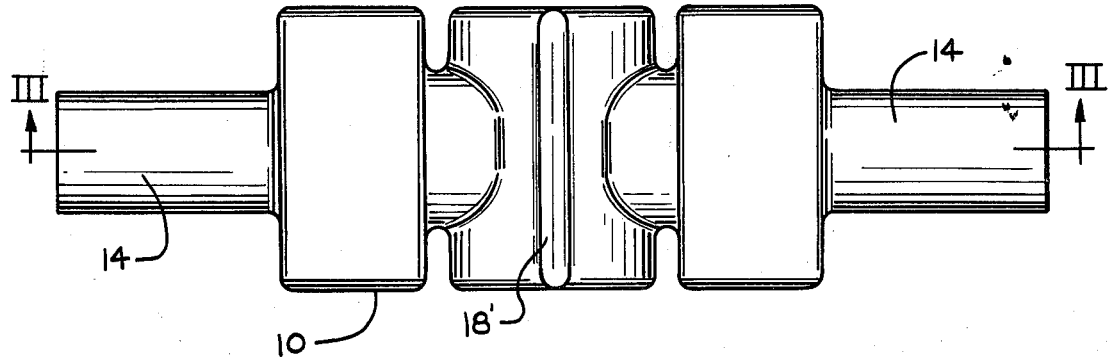
FIG. 2 is a side elevational view of a tubular blown plastic blank for fabricating two supports.
Figure 3:
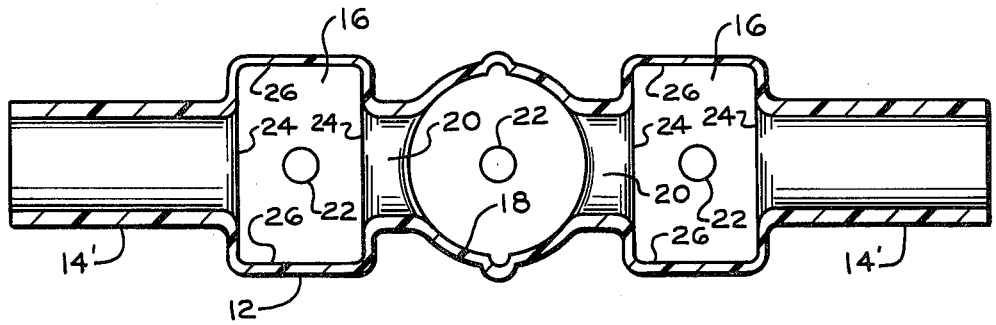
FIG. 3 is a plan view of one of the supports fabricated from the blank of FIG. 2.
Figures 4, 5:
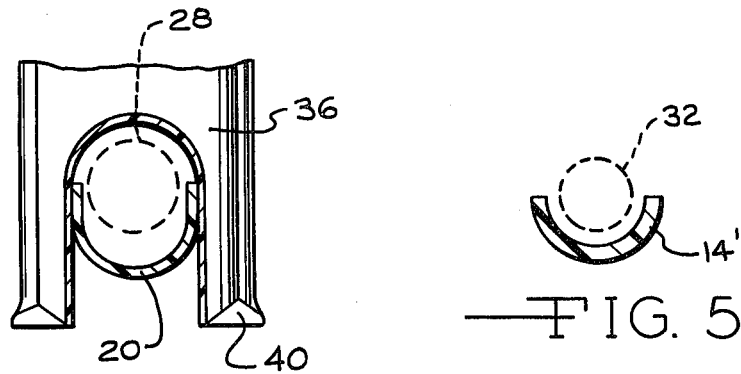
FIG. 4 is a vertical sectional view taken on line IV—IV of FIG. 1.
FIG. 5 is a vertical sectional view taken on line V—V of FIG. 1.

Shown in FIG. 3 is one of the two identical parts resulting from splitting the blank 10 along its longitudinally center line III—III of FIG. 2. The outrigger portions 14' project in opposite directions from the main body portion defined by the coupling cavities 16 spaced by the valve body cavity 18. Neck portions 20 connect the cavities 16 with the cavity 18, the portions 20 being generally U-shaped and of sufficient additional depth as compared with the radius of the portion 14' to accommodate the valve ends.

The cavities 16 and 18 each have relatively flat bottoms all disposed in substantially the same plane and preferably perforated in any suitable manner such as by holes 22 for drainage. End and side walls 24 and 26, respectively, define the cavities 16 with the walls 26 being vertically disposed so as to effectively transfer the torque of valve actuation to the embracing earth compacted against such walls.

Figure 1:
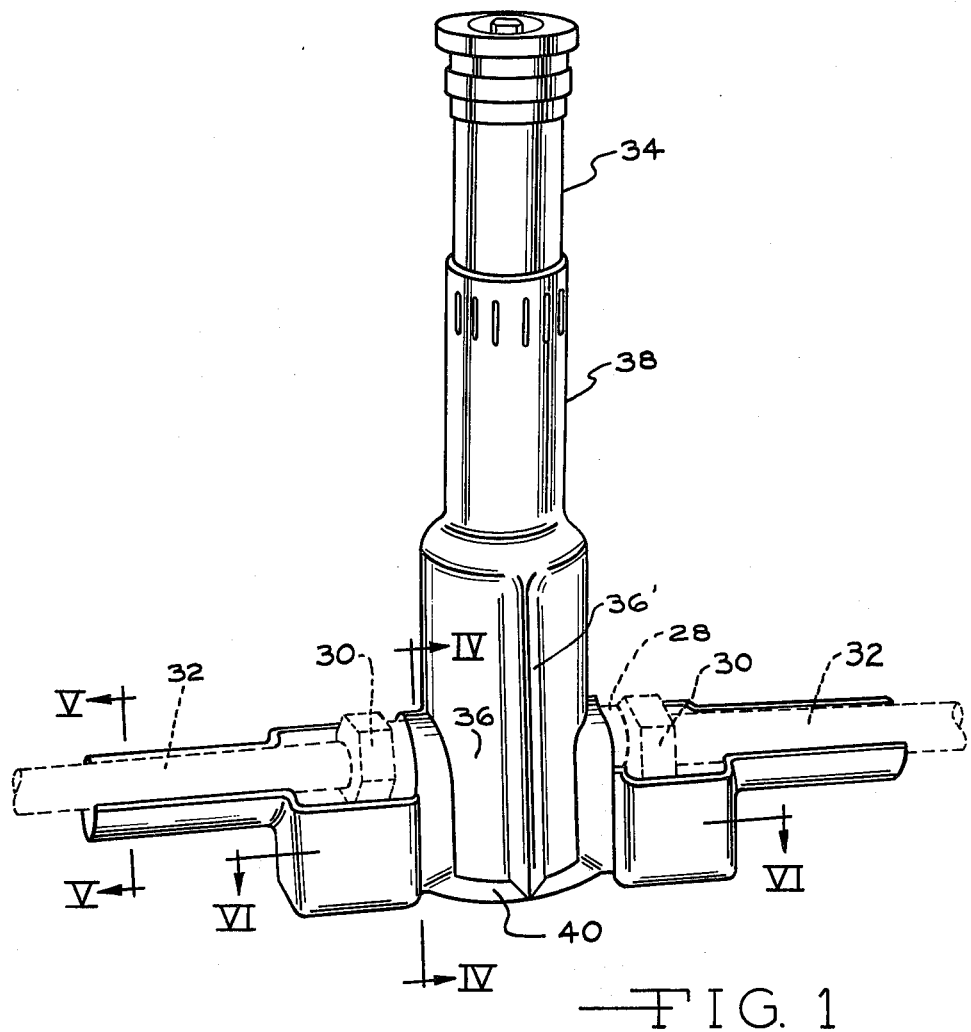
FIG. 1 is a perspective view of the curb box and support.

Depending upon the valve construction being used by the utility concern, the size of the cavities 16 and 18 will be varied to accommodate the shape of the valve and connecting ends. In the illustrated embodiment of FIG. 1 the valve, connections and pipe sections are all shown in dotted outline. The valve 28 may be a Mueller curb stop with Dresser gasket type compression connections 30 enabling the unthreaded ends of the steel, copper or plastic pipe sections 32 to be inserted within the connections 30 and sealed in position by drawing up the coupling nuts 11 all in a well known manner. It will be understood that the cavities 16 will accommodate the nuts or the connections 30 as well as a wrench end for tightening and loosening such nuts.

Cavity 18 and the neck portions 20 have external surfaces which are complementary to the internal surfaces of arched lower section of the curb box 34. Such surfaces may define ribs 18' and recesses 36'. This will be readily understood from a consideration of the horizontal section taken on line VI—VI of FIG. 6. With the arch portion 36 of the lower section 38 of the curb box 34 firmly embracing the cavity 18 and pushed downwardly on the support 12 to dispose the base 40 of the arch portion 36 in the plane of the bottom of cavities 16, the body of the valve 28 is completely encompassed in the area of the cavity 18. With this arrangement the arched portion 36 acts to reinforce and stiffen the wall structure defining the cavity 18.

Figure 6:
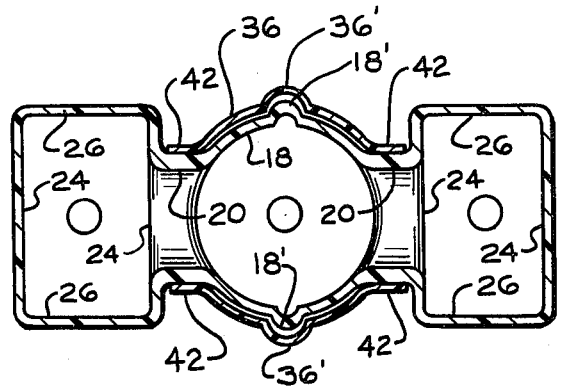
FIG. 6 is a horizontal sectional view taken on line VI—VI of FIG. 1.

It will be noted from FIG. 6 that vertical edges of the flanges 42 of the arched portion 36 are disposed adjacent the walls 24 of the cavities 16. This tends to support the curb box 34 normal to the bottom of the ditch as an aid to backfilling of the ditch with the curb box properly supported in an upright position. Axial alignment of the curb box 34 and the valve 28 in the cavity 18 is assured through the same structural association.

In addition to resisting the torque of valve actuation, the cavities 16 and 18 function as a mold for a protective coating material that may be used for mitigating the corrosive effects of the soil on the valve 28, and its connections 30.

I claim:

1. In combination with a curb box, a valve support having opposed elongated and longitudinally spaced vertical side portions against which the earth is adapted to be packed to resist the torque of valve actuation, said valve support being of open top construction throughout its entire longitudinal extent to permit a valve and associated conduit lines to be lowered into the support with the curb box removed, a central cavity defined in said support to receive a valve, connection cavities defined on opposite sides of said central cavity and partially defined by said side portions to receive the conduit lines, said curb box having a lower portion defining an arch embracing said central cavity, and means defining an interference fit between said arch and said support to align each said arch with said central cavity and to brace said curb box normal to the longitudinal axis of said support.

2. In combination with a curb box, a valve support particularly designed for use with plastic lines used in the distribution of such fluids as gas and water and characterized by the protection of the lines from the torque of valve actuation and the upright support of the curb box, said valve support having opposed elongated and longitudinally spaced vertical side portions against which the earth is adapted to be packed to resist the torque of valve actuation, said valve support being of open top construction throughout its entire longitudinal extent to permit a valve and associated conduit lines to be lowered into the support with the curb box removed, a central cavity defined in said support to receive a valve, connection cavities defined on opposite sides of said central cavity and partially defined by said side portions to receive the conduit lines, said curb box having a lower portion defining an arch embracing said central cavity, and means defining an interference fit between said arch and said support to align said arch with said central cavity and to brace said curb box normal to the longitudinal axis of said support.

3. In combination with a curb box, a valve support particularly designed for use with plastic lines used in the distribution of such fluids as gas and water and characterized by the protection of the lines from the torque of valve actuation and the upright support of the curb box, said valve support having outrigger portions in which the lines are adapted to be disposed and against which the earth is adapted to be packed to resist the torque of valve actuation, said valve support being of open top construction throughout its entire longitudinal extent to permit a valve and associated conduit lines to be lowered into the support with the curb box removed, a central cavity defined between said outrigger portion to receive the valve actuated through the curb box, cavities on opposite sides of said central cavity to receive the connections between the valve and the lines, said curb box having a lower portion defining an arch embracing said central cavity, and means defining an interference fit between said arch and said support to align said arch with said central cavity and to brace said curb box normal to the longitudinal axis of said support.

* * * * *